Jan. 17, 1961 L. W. HANSON 2,968,456
AIRFOIL CONSTRUCTION
Filed Feb. 7, 1958 2 Sheets-Sheet 1
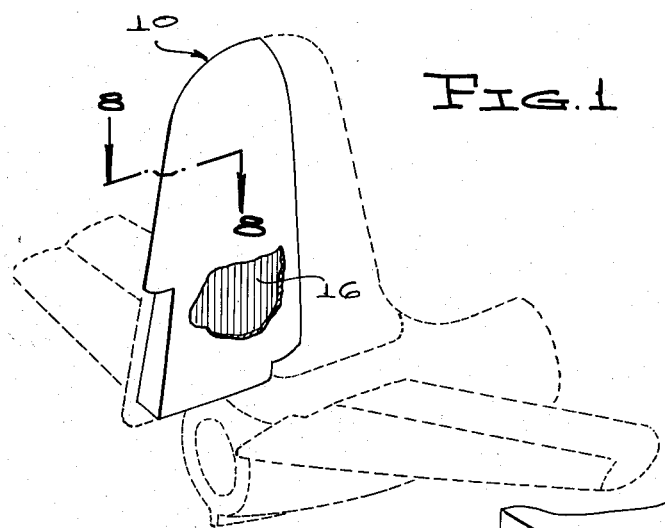
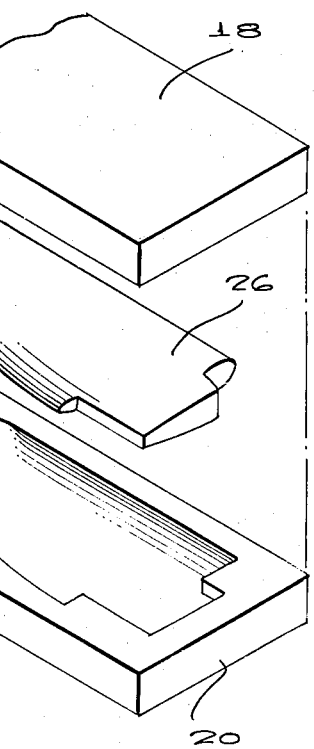
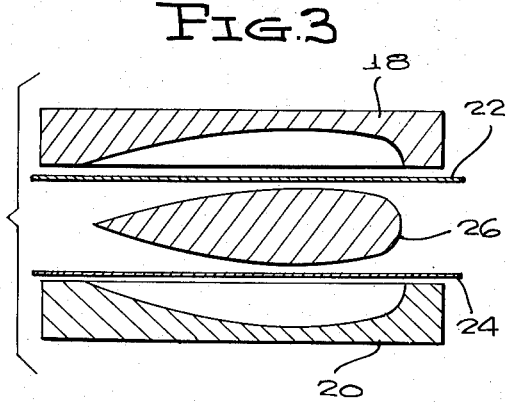
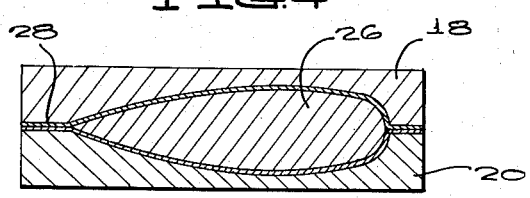
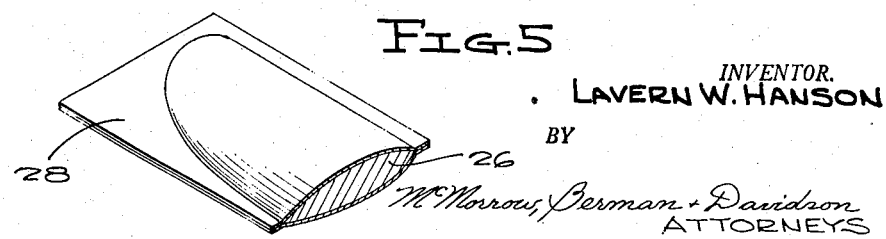
INVENTOR.
LAVERN W. HANSON
BY
McMorrow, Berman & Davidson
ATTORNEYS

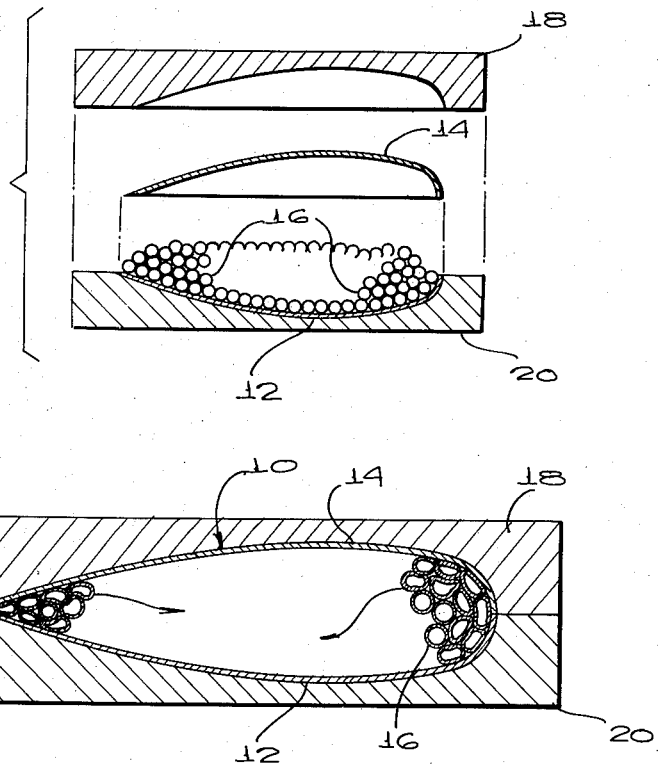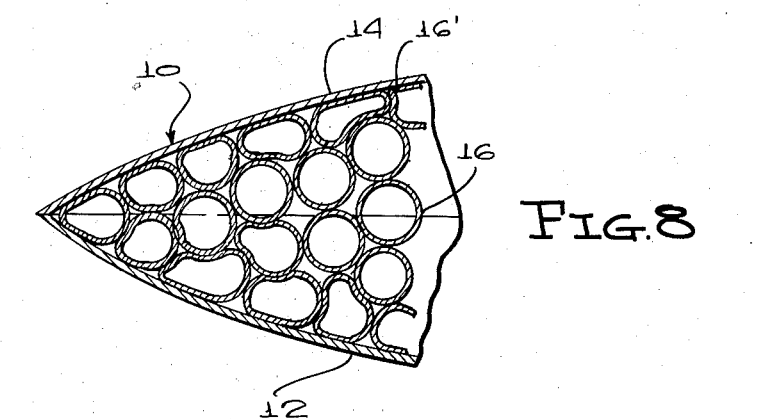

United States Patent Office 2,968,456
Patented Jan. 17, 1961

2,968,456
AIRFOIL CONSTRUCTION
Lavern W. Hanson, Rio, Ill.
Filed Feb. 7, 1958, Ser. No. 713,932
3 Claims. (Cl. 244—123)

The present invention relates to aircraft generally and in particular to an airfoil construction.

An object of the present invention is to provide an air foil which lends itself to ease and efficiency of manufacture, which is of simple structure and is sturdily constructed, and one which is economically feasible.

Another object of the present invention is to provide an airfoil which may be adapted for use as a storage space for fuel, one which may be substituted for any aircraft surface member as desired, and one which is highly effective in action.

These and other objects and advantages of the present invention will be fully apparent from the following description when taken in connection with the annexed drawings, in which:

Figure 1 is an isometric view in dotted lines of a tail section of an aircraft, with a rudder element constructed according to the present invention installed thereon;

Figure 2 is an isometric exploded view of a mold used in the construction of the airfoil of the present invention;

Figure 3 is a sectional view of the mold shown in Figure 2 with unformed half skin sections interposed on each side of the coils of the mold;

Figure 4 is a view in section showing the mold closed;

Figure 5 is an isometric view showing the skin half sections removed from the mold and prior to removal of the coil from between the skin half sections;

Figure 6 is a sectional view of a mold, on an enlarged scale, showing the skin half sections trimmed and re-inserted into the mold halves with the tubes partially inserted into the lower one of the skin half sections;

Figure 7 is a sectional view, on an enlarged scale, of the mold closed upon the skin half sections and enclosed tubes; and Figure 8 is a fragmentary view, on an enlarged scale, taken on the line 8—8 of Figure 1.

Referring in greater detail to the drawings in which like numerals indicate like parts throughout the several views, the airfoil of the present invention is designated generally by the reference numeral 10 in Figure 1. The airfoil 10 is formed from a pair of preformed half skin sections (Figure 8) arranged in face to face relation with the perimeters of such half sections abutting and fixedly secured together to form a hollow skin body having two ends, the sections being designated by the reference numerals 12 and 14.

A plurality of cylindrical bendable tubes 16, all of the same cross sectional area, are positioned within the body and extend longitudinally from one end to the other end of the body. The tubes 16 are adhesively secured to each other and to the inner face of the body of the airfoil 10. As shown in Figures 7 and 8, the tubes 16 wholly filling the space in the body and are piled in contacting engagement with each other with the tubes in contacting engagement with the inner face of the airfoil 10 being distorted, as at 16', so as to provide contacting surfaces conforming to the adjacent portions of the inner face of the airfoil 10.

A preferred form of manufacture of the present invention is shown in Figures 2 to 4 and 6, 7. First, a pair of mold halves, 18 and 20, are arranged in abutting spaced relation, as shown in Figure 2 and in Figure 3. A pair of sheets of formable metal as at 22 and 24 are positioned over the confronting faces of the mold halves 18 and 20 and a solid core 26 is inserted therebetween.

The mold halves 18 and 20 are brought together as in Figure 4 and the half skin sections 12 and 14 are thus formed from the sheets 22 and 24 with their marginal edges, as at 28 in Figure 5, to be trimmed from such sections 12 and 14 as the next step.

The airfoil half skin sections 12 and 14 are returned to the mold halves 18 and 20 and a plurality of cylindrical bendable tubes 16 are inserted therebetween so as to extend from one end to the other end of the skin sections 12 and 14.

The mold is then closed again as shown in Figure 7 to deform and distort certain of those tubes 16 which are adjacent to the inner face of the body formed by the skin sections 12 and 14.

An adhesive, such as is known commercially as "Shell Epon 422," may be used to unite the tube 16 to the shell or inner face of the airfoil 10 as a unitary structure. Such adhesive, if used, is applied in a liquid form after the tubes 16 have been positioned within the hollow airfoil formed by the half skin sections 12 and 14 and prior to closing of the mold halves 18 and 20 on themselves with the pressure sufficient to deform the certain tubes 16' adjacent the inner face of the airfoil body.

What is claimed is:

1. An airfoil comprising a hollow skin body having two ends, a plurality of cylindrical bendable tubes all of the same cross sectional area positioned within said body and extending longitudinally from one end to the other end thereof and fixedly secured to each other and to the inner face of said body, said tubes wholly filling the hollow space in said body and being piled in contacting engagement with each other with the tubes in contacting engagement with the inner face of said body being distorted so as to provide contacting surfaces conforming to the adjacent portions of the body inner face.

2. An airfoil comprising a pair of preformed half skin sections arranged in face to face relation with the perimeters abutting and fixedly secured together to form a hollow skin body having two ends, a plurality of cylindrical bendable tubes, all of the same cross sectional area, positioned within said body and extending longitudinally from one end to the other end thereof and fixedly secured to each other and to the inner face of said body, said tubes wholly filling the hollow space in said body and being piled in contacting engagement with each other with the tubes in contacting engagement with the inner face of said body being distorted so as to provide contacting surfaces conforming to the adjacent portions of the body inner face.

3. An airfoil comprising a pair of preformed half skin sections arranged in face to face relation with the perimeters abutting and fixedly secured together to form a hollow skin body having two ends, a plurality of cylindrical bendable tubes, all of the same cross sectional area, positioned within said body and extending longitudinally from one end to the other end thereof and adhesively secured to each other and to the inner face of said body, said tubes wholly filling the hollow space in said body and being piled in contacting engagement with each other with the tubes in contacting engagement with the inner face of said body being distorted so as to provide contacting surfaces conforming to the adjacent portions of the body inner face.

References Cited in the file of this patent

UNITED STATES PATENTS

| | | |
|---|---|---|
| 1,930,285 | Robinson | Oct. 10, 1933 |
| 2,029,048 | Atwood | Jan. 28, 1936 |
| 2,063,005 | Payne | Dec. 1, 1936 |
| 2,540,482 | Hervey | Feb. 6, 1951 |
| 2,639,876 | Misfeldt | May 26, 1953 |
| 2,845,151 | Reinhold | July 29, 1958 |